US012016101B2

(12) United States Patent
Clauberg et al.

(10) Patent No.: US 12,016,101 B2
(45) Date of Patent: Jun. 18, 2024

(54) POWER SUPPLY CONFIGURATION ACROSS ISOLATION BARRIER

(71) Applicant: SIGNIFY HOLDING B.V., Eindhoven (NL)

(72) Inventors: Bernd Clauberg, Schaumburg, IL (US); Yuhong Fang, Naperville, IL (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 160 days.

(21) Appl. No.: 17/598,264

(22) PCT Filed: Mar. 25, 2020

(86) PCT No.: PCT/EP2020/058394
§ 371 (c)(1),
(2) Date: Sep. 25, 2021

(87) PCT Pub. No.: WO2020/193643
PCT Pub. Date: Oct. 1, 2020

(65) Prior Publication Data

US 2022/0191997 A1 Jun. 16, 2022

Related U.S. Application Data

(60) Provisional application No. 62/825,115, filed on Mar. 28, 2019.

(30) Foreign Application Priority Data

Apr. 16, 2019 (EP) .................................... 19169592

(51) Int. Cl.
*H05B 47/18* (2020.01)
*H05B 45/14* (2020.01)
(Continued)

(52) U.S. Cl.
CPC ............. *H05B 47/18* (2020.01); *H05B 45/14* (2020.01); *H05B 45/325* (2020.01); *H05B 45/375* (2020.01)

(58) Field of Classification Search
CPC ........ H05B 45/10; H05B 45/14; H05B 45/32; H05B 45/325; H05B 45/375; H05B 47/10; H05B 47/18
See application file for complete search history.

(56) References Cited

U.S. PATENT DOCUMENTS 6,107,755 A 8/2000 Katyl et al.
7,471,051 B1 12/2008 Wacknov et al.
(Continued)

FOREIGN PATENT DOCUMENTS

AU 2018100757 A4 7/2018
CN 204044571 U 12/2014
(Continued)

*Primary Examiner* — Jimmy T Vu

(57) ABSTRACT

A device, system, and method configure a power supply of a powered device. The powered device includes a digital addressable lighting interface (DALI) connected to a load to be powered by a power source. The powered device includes an isolator. The powered device includes a controller positioned on a primary side of the isolator. The controller is configured to generate a first signal to select whether to provide power to the 5 DALI at a zero current value or a maximum current value. The controller is further configured to generate a second signal to provide power to the DALI at a selected current value between the zero current value and the maximum current value.

11 Claims, 3 Drawing Sheets

(51) Int. Cl.

| | |
|---|---|
| ***H05B 45/30*** | (2020.01) |
| ***H05B 45/325*** | (2020.01) |
| ***H05B 45/375*** | (2020.01) |

(56) References Cited

U.S. PATENT DOCUMENTS

| | | | | |
|---|---|---|---|---|
| 8,093,820 | B1 | 1/2012 | Stevens | |
| 10,219,343 | B1 | 2/2019 | Schaemann et al. | |
| 2015/0123575 | A1 | 5/2015 | Hoffknecht et al. | |
| 2016/0174340 | A1 | 6/2016 | Rezeanu | |
| 2016/0212816 | A1 | 7/2016 | Ackmann | |
| 2017/0265260 | A1 * | 9/2017 | Briggs | H05B 45/46 |
| 2018/0054869 | A1 | 2/2018 | Mezack et al. | |

FOREIGN PATENT DOCUMENTS

| | | | | |
|---|---|---|---|---|
| CN | 104704922 | A | 6/2015 | |
| CN | 204929366 | U | 12/2015 | |
| CN | 107071958 | A | 8/2017 | |
| DE | 102010042724 | A1 | 4/2012 | |
| EP | 2477459 | A1 * | 7/2012 | H05B 33/0812 |
| EP | 2490509 | A2 | 8/2012 | |
| WO | 2014/035893 | A1 | 3/2014 | |
| WO | 2017204481 | A1 | 11/2017 | |
| WO | 2018/041687 | A1 | 3/2018 | |

* cited by examiner

POWER SUPPLY CONFIGURATION ACROSS ISOLATION BARRIER

CROSS-REFERENCE TO PRIOR APPLICATIONS

This application is the U.S. National Phase application under 35 U.S.C. § 371 of International Application No. PCT/EP2020/058394, filed on Mar. 25, 2020, which claims the benefit of U.S. Provisional Patent Application No. 62/825,115, filed on Mar. 28, 2019, and European Patent Application No. 19169592.3, filed on Apr. 16, 2019. These applications are hereby incorporated by reference herein.

BACKGROUND INFORMATION

A power source may supply energy to various components of an electronic device. For example, the electronic device may include a lighting component (e.g., a light emitting diode (LED)) to form a lighting device. The lighting device may be configured in a variety of different manners. For example, the lighting device may be configured as a connected lighting system. The connected lighting system may utilize different types of driver devices such as a smart driver device that provides signaling to different lighting loads which include sensors that interpret the signal. Such a connected lighting system may utilize a self-powered Digital Addressable Lighting Interface (DALI). The DALI may relate to an automated control of lighting using a network based system. Through the DALI, one or more passive DALI loads may be connected via this interface without a need of separate control components for each lighting load. A plurality of different types of lighting devices may utilize the DALI and the automated control provided through the DALI.

In a conventional lighting device, certain LED drivers with a DALI interface include an on-board current source (e.g., a DALI power supply). A conventional current setting for the current source in these LED drivers is approximately 55 mA. However, implementations of the lighting device with the LED drivers and the DALI interface may use a higher current. For example, a current setting of approximately 110 mA or more may be used in these implementations. One approach to accommodate different current settings is to make the same product with a different version of the power supply. However, this approach may be more costly and more limiting as the current setting that is preselected is the only option. For example, the lower current may be used for standard implementations but may not be used for implementations requiring the higher current. In another example, the higher current may create issues with backward compatibility. Selecting the higher current may also raise issues related to complying with the DALI Standard that specifies a maximum current of 250 mA. If multiple LED drivers are connected to the same DALI bus wires, the power supplies become additive and may lead to exceeding the 250 mA DALI limit (e.g., any more than two LED drivers operating at 110 mA would exceed the 250 mA DALI limit).

In addition, a conventional approach to turning the current supply on or off is to utilize a microprocessor or controller that generates a signal to indicate when the current is to be supplied. In one manner, the conventional approach may require an isolated interface where the microprocessor is disposed on a side of the isolated interface where the signal must go across an isolation barrier of the isolated interface. For example, the isolated interface may be an opto isolator.

The opto isolator may be turned on and off so that an opto diode of the opto isolator is conducting or not conducting resulting in the current supply being on or off, respectively. However, this only allows the use of a single current setting which faces the above described drawbacks. If the current setting is to be variable and selectable, an approach to achieve this operation is to introduce a second opto isolator. Thus, the first opto isolator may be used to turn the current supply on or off while the second opto isolator may be used to select a value of the current provided by the current supply that is turned on.

When considered from an individual scale, the introduction of the second opto isolator may appear cost effective as a solution to the issue of selecting a variable current setting for the DALI current source. However, when considered on a manufacturing scale in which the product is manufactured and sold in high volume (e.g., millions of units), the introduction of the additional opto isolator becomes a major cost. Accordingly, any part of the circuit that may be simplified or lowered in cost is of great importance.

SUMMARY

The exemplary embodiments are directed to a powered device configuring a power supply. The powered device comprises a digital addressable lighting interface (DALI) connected to a load to be powered by a power source. The powered device comprises an isolator. The powered device comprises a controller positioned on a primary side of the isolator. The controller is configured to generate a first signal to select whether to provide power to the DALI at a zero current value or a maximum current value. The controller is further configured to generate a second signal to provide power to the DALI at a selected current value between the zero current value and the maximum current value.

The exemplary embodiments are directed to a method for configuring a power supply. The method comprises generating a first signal to select whether to provide power to a digital addressable lighting interface (DALI) connected to a load to be powered by a power source at a zero current value or the maximum current value. The method comprises generating a second signal to select to provide power to the DALI at a selected current value that is between the zero current value and the maximum current value.

The exemplary embodiments are directed to a powered device configuring a power supply. The powered device comprises a power supply, a digital addressable lighting interface (DALI) connected to a load to be powered by the aux power supply, and an opto isolator. The powered device comprises a microprocessor positioned on a primary side of the opto isolator. The microprocessor is configured to generate an activation drive signal to select whether to provide power to the DALI at a zero current value or a maximum current value. The microprocessor is further configured to generate a pulse width modulated (PWM) signal to select to provide power to the DALI at a selected current value between the zero current value and the maximum current value. The powered device comprises a buck converter receiving a reference current based on the PWM signal to generate a fixed voltage corresponding to the selected current value that is provided to the DALI.

DETAILED DESCRIPTION

Figure 1:
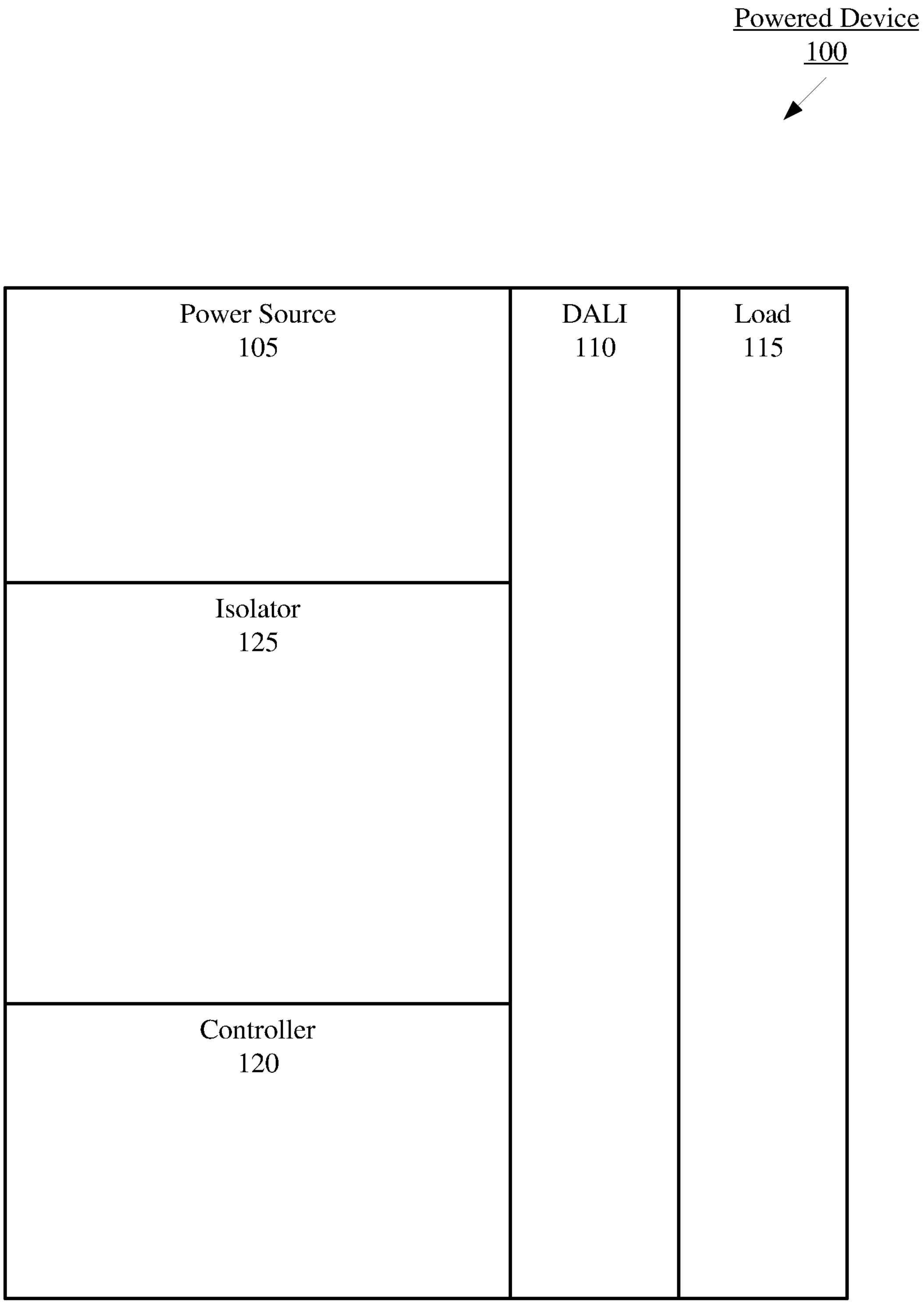
FIG. 1 shows an exemplary powered device according to the exemplary embodiments.

The exemplary embodiments may be further understood with reference to the following description and the related appended drawings, wherein like elements are provided with the same reference numerals. The exemplary embodiments are related to a device, a system, and a method for dynamically selecting a current setting for a Digital Addressable Lighting Interface (DALI) current source in an electronic device that utilizes the DALI. The exemplary embodiments provide a compact approach to selecting when a current is to be supplied to the DALI and a current setting. The exemplary embodiments directed to a current source that is configurable to different current settings from a primary side microprocessor while only including a minimal number of components. As will be described in detail below, the exemplary embodiments provide a mechanism that utilizes a pulse width modulation (PWM) signal across an isolation barrier that sets multiple configuration parameters with a single opto isolator.

The exemplary embodiments are described with regard to particular circuitry components that are interconnected within the power control mechanism of the electronic device. The exemplary embodiments are also described with regard to these particular circuitry components being arranged in a specific configuration. However, the types of circuitry components and the specific arrangement are only for illustrative purposes. Different types of circuitry components and different arrangements may also be used within the scope of the exemplary embodiments to achieve a substantially similar manner of dynamically selecting a current setting across an isolator. In a first example, the load of the electronic device is described as a diode such as a light emitting diode (LED). However, the load may include any sub-component that draws power to activate the sub-component or stops drawing power to deactivate the sub-component. In a second example, the electronic device is described as including an isolator such as an opto isolator. However, the opto isolator may be any isolator circuit component between a controller (e.g., a microprocessor) and a DALI.

The exemplary embodiments are further described with regard to certain values associated with the powered device as a whole or for individual components of the powered device. For example, the values may be selectable current settings. In another example, the values may be parameters of a PWM signal. However, these exemplary values pertain to a particular implementation of the exemplary embodiments. Thus, any value used to describe the current setting selection mechanism according to the exemplary embodiments is only for illustrative purposes and other values may be used within the scope of the exemplary embodiments.

The exemplary embodiments provide a current setting selection mechanism that allows a current to be selectively supplied to a DALI as well as a plurality of different current settings for that current. Through a single opto isolator between the controller and the DALI, the controller may generate a corresponding signal that enables the current to be supplied at a particular current setting. In this manner, a single opto-isolator may be used to both turn the current supply on or off and select the amount of current to be supplied.

FIG. 1 shows an exemplary powered device 100 according to the exemplary embodiments. The powered device 100 includes a power source 105 that provides power to a load 115 through a DALI 110. The load 115 may be any type of component that draws power (e.g., a LED, a light bulb, an audio output component, etc.). The powered device 100 may include a controller 120 that generates a signal to control whether the load 115 is to be supplied current through the DALI 110 and an isolator 125 through which the signal from the controller 120 crosses.

The current setting selection mechanism according to the exemplary embodiments may utilize the controller 120 to receive an input or determine a current setting to be provided to the DALI 110. Based on the current setting, the controller 120 may generate an activation drive signal or a modulated drive signal that crosses an isolation barrier of the isolator 125 and results in a corresponding current having a selected value from the power source 105 to flow to the DALI 110 and the load 115.

In a first operation, the controller 120 may be configured to turn the current to the DALI 110 on or off. The controller 120 may generate an activation drive signal. When the activation drive signal is off, the current supply to the DALI 110 is off (e.g., 0 mA). When the activation drive signal is on, the current supply to the DALI 110 is on (e.g., a maximum current value such as 110 mA).

In a second operation, according to the exemplary embodiments, the controller 120 may be configured to enable current to flow to the DALI 110 at a selected value. The controller 120 may generate a modulated drive signal. When the current setting to be used is not 0 or the maximum current, the controller 120 may identify the current value of the current setting. The controller 120 may then determine a corresponding pulse width modulation (PWM) signal that results in the current setting to be provided to the DALI 110. Accordingly, when the current to be provided to the DALI 110 is a value between the off and on values (e.g., 0 mA to a maximum current), the controller 120 may utilize the modulated drive signal.

The modulated drive signal may be generated as a PWM signal such that a diode of the isolator 125 may be driven to conduct with a duty cycle and frequency corresponding to the selected PWM. The modulated drive signal may enable the current to be supplied to the DALI 110 with a current proportional to the PWM duty cycle of the isolator 125. According to the exemplary embodiments, the single isolator 125 may be used to set any current level for the DALI 110 between 0 mA and a predefined maximum current by changing the duty cycle of the modulated drive signal from 0 to 100%, where the duty cycle is directly proportional to the current set point. Those skilled in the art will understand that the logic for the proportionality may be inverted.

The powered device 100 is illustrated where the components are incorporated into one overall electronic device. However, in another implementation, the components of the powered device 100 may be at least partially separated from one another while having a communication functionality, may be modular components (e.g., separate components connected to one another), may be incorporated into one or more devices, or a combination thereof. The powered device 100 may also utilize a wired connection between the components. However, those skilled in the art will understand that any manner of communication of signals, power, or other indications/commands may be used between the components of the powered device 100. For example, a wired connection, a wireless connection, a network connection, or a combination thereof may be used.

Figure 2:
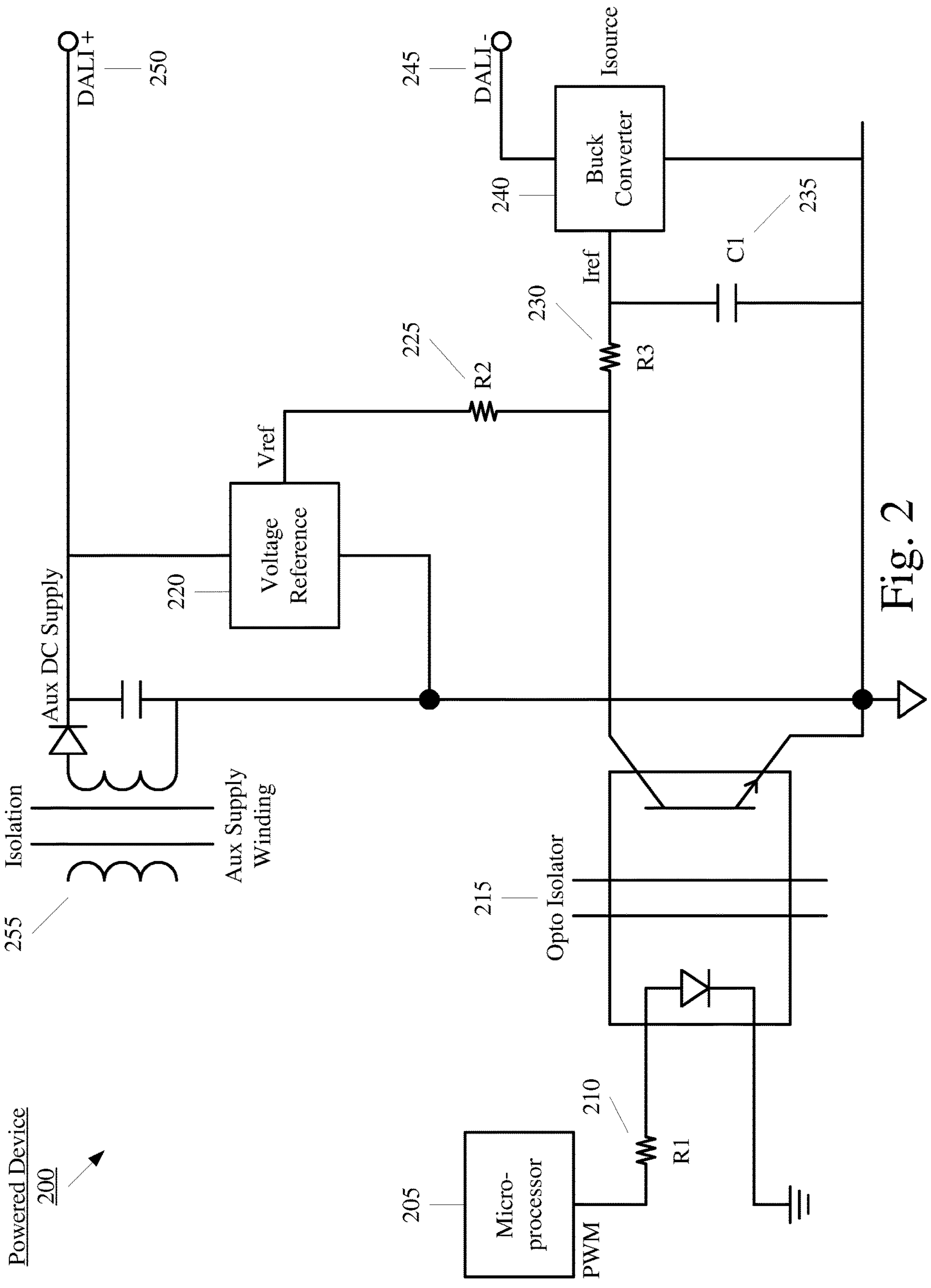
FIG. 2 shows an exemplary implementation of a powered device according to the exemplary embodiments.

FIG. 2 shows an exemplary implementation of a powered device 200 according to the exemplary embodiments. The powered device 200 may be a particular arrangement of the powered device 100 of FIG. 1 according to the exemplary embodiments. The implementation of the powered device 200 illustrated in FIG. 2 relates to the current setting selection mechanism being arranged in a particular manner in which an activation drive signal may turn a current on or off from a zero current to a maximum current or a modulated drive signal may turn a current on to a selected current between zero and the maximum current. The powered device 200 may include a microprocessor 205, a resistor 210, an opto isolator 215, a voltage reference 220, a resistor 225, a resistor 230, a capacitor 235, a buck converter 240, a negative DALI port 245, a positive DALI port 250, and a aux power supply 255.

The implementation of the powered device 200 in FIG. 2 may be any circuitry implementation in which the components are interconnected with one another for signals to be exchanged and power to be supplied along various circuit pathways. These components may be included on one or more integrated circuits, on one or more printed circuit boards, or implemented individually as needed. The exemplary implementation of the powered device 200 described herein relates to the powered device 200 being a set of circuitry components. However, the powered device 200 may also be implemented in a variety of other ways.

In the implementation of the powered device 200, select components may correspond to the powered device 100. For example, the microprocessor 205 may correspond to the controller 120; the opto isolator 215 may correspond to the isolator 125; the aux power supply 255 may correspond to the power source 105; and the negative DALI port 245 and the positive DALI port 250 may be ports of the DALI 110. Since the powered device 200 illustrates a particular implementation of the powered device 100, the components included in the powered device 200 are only illustrative. For example, the isolator 125 being an opto isolator 215 is only illustrative and any isolator circuit may be used. In another example, the controller 120 being a microprocessor 205 is only illustrative and any control circuit may be used.

According to the exemplary implementation of the powered device 200, the microprocessor 205 may be on a primary side of the opto isolator 215. In the first operation utilizing the activation drive signal, the microprocessor 205 may generate an on activation drive signal or an off activation drive signal when the current to be provided to the DALI 110 via the negative DALI port 245 and the positive DALI port 250 is either 0 or a maximum current. The microprocessor 205 may utilize any activation drive signal to cause the opto isolator 215 to be on or off resulting in the zero current or the maximum current.

In the second operation utilizing the modulated drive signal, the microprocessor 205 on the primary side isolation may generate a PWM signal that drives a diode of the opto isolator 215 via the resistor 210. The output of the opto isolator 215 is connected to the reference voltage 220 (Vref) through a current limiting resistor 225. This circuit pathway generates a square wave signal at the junction of the resistor 225 and the resistor 230 (e.g., assuming that the resistor 230 is very large compared to the resistor 225 such as beyond a predetermined difference that generates the square wave signal). The resistor 230 in conjunction with the capacitor 235 may be used as a filter that converts an input to the resistor 230 (e.g., the output of the resistor 225) which is based on the PWM. The input of the resistor 230 may be approximately 0 or Vref based on the duty cycle. The resistor 230 and the capacitor 235 may be used to average the PWM signal to generate a DC voltage reference that is used to set the current reference (Iref) for the buck converter 240.

If the PWM is defined as the voltage between the resistors 225, 230 (e.g., the inverted signal of the PWM of the microprocessor 205), then the duty cycle of the PWM may be proportional to the current set point for the current source of the DALI 110. As illustrated, the current source for the DALI 110 may be the buck converter 240. Since the buck converter 240 input pins are usually of a high impedance, there is no need for further buffering after the capacitor 235. The output of the buck converter 240 may be a fixed voltage to the negative DALI port 245.

Furthermore, since the current setting selection mechanism is a configuration set point for the supply current of the DALI 110, a very fast reaction speed is not necessary as the current supply may be fixed for a given installation and no dynamic reference current changes are needed. Accordingly, the exemplary embodiments enable the current setting selection mechanism to freely choose the PWM frequency to be slow enough for the opto isolator 215 (which may be a standard opto isolator without any modification) to allow the powered device 200 to be very low cost. For example, a 100 Hz PWM frequency may be chosen which makes the rise and fall time delays of the opto isolator 215 negligible and allows for significantly accurate current setting for the Isource of the buck converter 240. The microcontroller 205 may allow the PWM duty cycle to be accurate, even if the frequency may not be as accurate.

Figure 3:
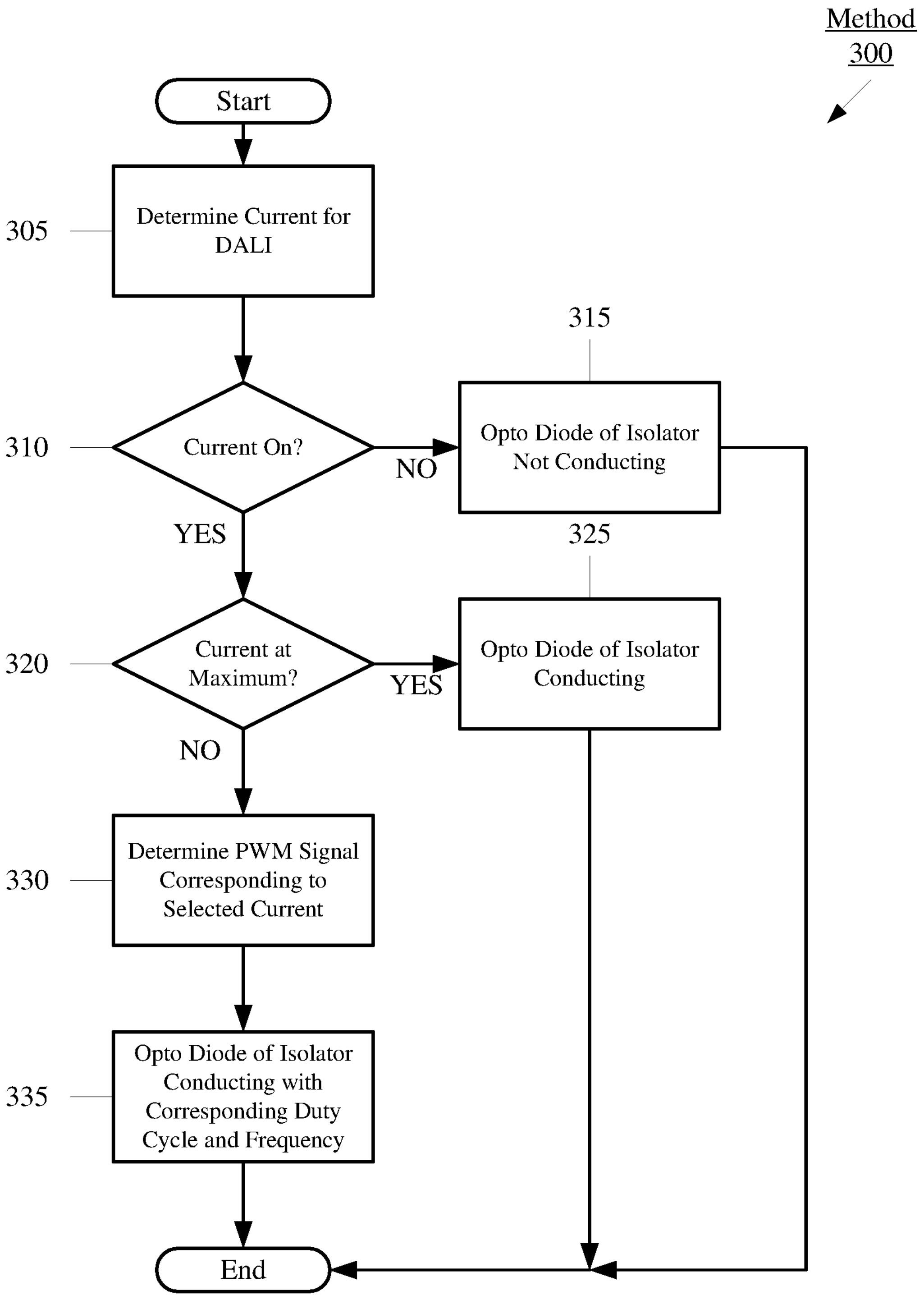
FIG. 3 shows an exemplary method for dynamically selecting a current according to the exemplary embodiments.

FIG. 3 shows an exemplary method 300 for dynamically selecting a current according to the exemplary embodiments. The method 300 may relate to the mechanism of the exemplary embodiments in which the microprocessor 205 is configured to determine when current is to be supplied to the DALI interface 110 (e.g., including the DALI ports 245, 255) and an amount of current to be supplied (e.g., from 0 to 100% of an available current). The method 300 will be described with respect to the powered device 100 of FIG. 1 as well as the implementation of the powered device 200 as illustrated in FIG. 2. Substantially similar components of the powered device 100 and exemplary implementation of the powered device 200 will be used interchangeably.

In 305, the powered device 100 determines a current to be supplied to the DALI 110. As described above, the microcontroller 205 may receive an input corresponding to a current setting or determine a current setting to be used in the powered device 200. In 310, the powered device 100 determines whether current is to be supplied to the DALI 110. If no current is to be supplied to the DALI 110, the powered device 100 continues to 315 where the activation drive signal causes the diode of the opto isolator 215 to not conduct resulting in no current being supplied to the DALI 110. For example, the microprocessor 205 may generate an off activation drive signal. If current is to be supplied to the DALI 110, the powered device 100 continues to 320.

Whether the current is to be supplied to the DALI 110 may also be based on a duty cycle of the powered device 100. For example, the duty cycle may indicate when a particular load 115 is to receive power. The duty cycle may also have a waveform such as a square wave. Accordingly, based on the square wave, the current to be supplied may be 0 or a selected current value. The selected current value may correspond to the input or determination performed in 305.

In 320, the powered device 100 determines whether the current to be supplied is a maximum current (e.g., during an on duty cycle). If the current to be supplied is the maximum current, the powered device continues to 325 where the activation drive signal causes the diode of the opto isolator 215 to conduct resulting in the maximum current being supplied to the DALI 110. For example, the microprocessor 205 may generate an on activation drive signal. If the current is to be set at a value between 0 and the maximum value, the powered device 100 continues to 330.

In 330, the powered device 100 determines the modulated drive signal having a duty cycle and a frequency that corresponds to the selected current setting for current to be supplied to the DALI 110. For example, the microprocessor 205 may generate the modulated drive signal as a PWM signal. In 335, the PWM signal drives the diode of the opto isolator 215 to conduct with the corresponding duty cycle and frequency. Through the voltage reference 220, the resistors 225, 230, the capacitor 235, and the buck converter 240, the current may be provided to the DALI 110 (e.g., via the negative DALI port 245) at the selected current value which is greater than 0 but less than the maximum current value.

The exemplary embodiments provide a device, system, and method of dynamically selecting a current setting for power to be provided to load via a DALI. The current setting selection mechanism according to the exemplary embodiments perform either a first operation to turn a current to the DALI on or off using an activation drive signal or a second operation to provide a current to the DALI at a selected current value using a modulated drive signal. The modulated drive signal may be configured as a PWM having a duty cycle and a frequency that corresponds to the selected current value.

Those skilled in the art will understand that the above-described exemplary embodiments may be implemented in any suitable software or hardware configuration or combination thereof. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A powered device, comprising:

a digital addressable lighting interface (DALI) connected to a load to be powered by a power source;

an opto-isolator connected to the DALI;

a controller positioned on a primary side of the opto-isolator, the controller configured to generate a first signal to select whether to provide power to the opto-isolator so that the opto-isolator is conducting or not conducting, wherein when the opto-isolator is conducting the DALI has a maximum current value and when the opto-isolator is not conducting the DALI at a zero current value, the controller further configured to generate a modulated second signal to provide power to the opto-isolator, so that the opto-isolator is conducting with a duty cycle and frequency, and wherein the DALI has a selected current value between the zero current value and the maximum current value, based on the modulated second signal; and a buck converter receiving a current reference based on a voltage reference based on the second signal, the buck converter configured to output a fixed voltage to the DALI.

2. The powered device of claim 1, wherein the power source is a DC power supply from a secondary winding of a transformer.

3. The powered device of claim 1, wherein the modulated second signal is a pulse width modulation (PWM) signal having a frequency corresponding to the selected current value.

4. The powered device of claim 1, further comprising:

a first resistor having a first resistance; and a second resistor having a second resistance greater than a predetermined difference to the first resistance, wherein a voltage between the first and second resistors corresponds to a modulation corresponding to the selected current value.

5. The powered device of claim 4, further comprising:

a capacitor configured to, in conjunction with the second resistor, filter the input of the second resistor.

6. The powered device of claim 1, wherein the maximum current value is 110 mA.

7. The powered device of claim 1, wherein the load is a light emitting diode (LED).

8. A method, comprising:

generating a first signal to select whether to provide power to an opto-isolator so that the opto-isolator is conducting or not conducting, wherein when the opto-isolator is conducting a digital addressable lighting interface (DALI) connected to the opto-isolator and a load to be powered by a power source has a maximum current value and when the opto-isolator is not conducting the DALI at a zero current value;

generating a modulated second signal to select to provide power to the opto-isolator, so that the opto-isolator is conducting with a duty cycle and frequency, and wherein the DALI has a selected current value that is between the zero current value and the maximum current value, based on the modulated second signal;

receiving, at a buck converter, a current reference based on a voltage reference based on the second signal; and outputting, by the buck converter, a fixed voltage to the DALI by the buck converter.

9. The method of claim 8, wherein the modulated second signal is a pulse width modulation (PWM) signal having a frequency corresponding to the selected current value.

10. The method of claim 8, wherein a voltage between a first resistor having a first resistance and a second resistor having a second resistance greater than a predetermined difference to the first resistance corresponds to a modulation corresponding to the selected current value.

11. The method of claim 10, further comprising:

filtering, by a capacitor and the second resistor, the input of the second resistor.

* * * * *